United States Patent
Matsubara et al.

Patent Number: 5,374,882
Date of Patent: Dec. 20, 1994

[54] METHOD OF CONTROLLING SERVOMOTOR

[75] Inventors: Shunsuke Matsubara; Tadashi Okita; Yasusuke Iwashita, all of Oshino, Japan

[73] Assignee: Fanuc Ltd., Yamanashi, Japan

[21] Appl. No.: 87,749

[22] PCT Filed: Nov. 10, 1992

[86] PCT No.: PCT/JP92/01453
§ 371 Date: Jul. 12, 1993
§ 102(e) Date: Jul. 12, 1993

[87] PCT Pub. No.: WO/9310489
PCT Pub. Date: May 27, 1993

[30] Foreign Application Priority Data
Nov. 21, 1991 [JP] Japan .................. 3-322425

[51] Int. Cl.$^5$ .................. G05B 11/01
[52] U.S. Cl. .................. 318/560; 318/432
[58] Field of Search .................. 318/432, 560

[56] References Cited

U.S. PATENT DOCUMENTS

| | | | |
|---|---|---|---|
| 4,639,652 | 1/1987 | Takahashi et al. | 318/432 |
| 5,063,335 | 11/1991 | Baechtel et al. | 318/560 |
| 5,191,272 | 3/1993 | Torrii et al. | 318/560 |
| 5,223,778 | 6/1993 | Svarovsky et al. | 318/560 |

FOREIGN PATENT DOCUMENTS

| | | |
|---|---|---|
| 0087812 | 9/1983 | European Pat. Off. |
| 0314800 | 5/1989 | European Pat. Off. |
| 60-54020 | 3/1984 | Japan |
| 61-32121 | 2/1986 | Japan |
| 62-212802 | 9/1987 | Japan |
| 1-258009 | 10/1989 | Japan |
| 3-210607 | 9/1991 | Japan |
| 2235067A | 2/1991 | United Kingdom |

Primary Examiner—William M. Shoop, Jr.
Assistant Examiner—Karen Masih
Attorney, Agent, or Firm—Staas & Halsey

[57] ABSTRACT

A method of controlling a servomotor, characterized by faster convergence of both positional deviations and velocity deviations, higher responsibility as well as an improved resistivity against a disturbance, and being free from any mechanical resonance. An adjustment gain G is increased when a torque command Tc1 received from a conventional velocity control is small, whereas the adjustment gain G is decreased when the torque command Tc1 is large. A torque command Tc2 obtained by multiplying the Tc1 to the output from the velocity control section by the adjustment gain G is supplied to the servomotor. The gain is to be heightened in the case where the positional deviation and velocity deviation are both small and the torque command Tc1 is also small, to thereby ensure a higher responsibility and a rapid convergence. Moreover, the gain is to be suppressed when the torque command Tc1 is large, thus preventing the occurrence of a mechanical resonance.

10 Claims, 4 Drawing Sheets

MOTOR AND MECHANICAL SYSTEM

METHOD OF CONTROLLING SERVOMOTOR

BACKGROUND OF THE INVENTION

1. Field of the Invention

The present invention relates to a method of controlling a servomotor for use as a drive source in machine tools and robots.

2. Description of the Related Art

Feed rods of a machine tool, arms of a robot or the like are driven by a servomotor which performs a velocity loop control or a position loop control. In the conventional control of the servomotor, a velocity loop gain is always set at an unvaried value allowing a certain degree of margin with respect to a gain level which may cause a mechanical resonance.

FIG. 1 is a block diagram of a servomotor position control system, by way of example, in which reference numeral 1 denotes a position control section with a position loop gain Kp; reference numeral 2 denotes a velocity control section with a integral gain k1 and a proportional gain k2; reference numeral 3 denotes a motor and mechanical system, and reference numeral 4 denotes a term integrating a velocity to derive a position.

The torque command Tc (or current command) can be derived from the procedure comprising the steps of: subtracting a position $\theta$ detected, for instance, by a position detector from a position command $\theta d$ to find a positional deviation; multiplying the positional deviation by the position loop gain Kp to find a velocity command vd; subtracting an actual velocity v detected, for instance, by a velocity detector from the velocity command vd to find a velocity deviation; adding a value, obtained by integrating the velocity deviation and then multiplying the result by the integral gain k1, to a value, obtained by multiplying the velocity deviation by the proportional gain k2, thereby obtaining a torque command Tc (current command). The servomotor is commonly driven in response to a torque command Tc (and further through a current loop control). Also, it is a common practice to control the servomotor only by means of the speed loop control without the position loop control.

In the servomotor control as described above, reductions in the positional deviation and then the velocity deviation leads to a reduction in the torque command Tc, which in turn results in a reduction in an output torque of the servomotor, thereby further preventing the positional deviation and velocity deviation from converging rapidly. Therefore, increasing the integral gain k1 and the proportional gain k2 in values not only will accelerate the convergence but improve the responsibility and the resistivity against a disturbance, thereby improving the performance of the control system. However, higher storage and proportional gains may possibly bring about a mechanical resonance as the torque command is enlarged, and lead to an adverse effect such as an overshoot or undershoot, thereby eventually causing a fluctuation in the case of greater variation in the velocity command.

In the conventional manner employing the fixed gains, the gains are restricted by the oscillation limit causing a mechanical resonance, which in turn restricts the control performance of the servomotor.

SUMMARY OF THE INVENTION

It is therefore the object of the present invention to provide a method of controlling a servomotor, characterized by faster convergence of both positional deviations and velocity deviations, a higher responsiveness as well as an improved resistivity against a disturbance, and being free from any mechanical resonance.

In order to accomplish the above object, the method of controlling a servomotor according to the present invention comprises the step of adjusting a velocity loop gain depending on the magnitude of a torque command issued from a velocity loop control. More specifically, the method comprises the steps of detecting the magnitude of a torque command issued from a velocity loop control, decreasing a velocity loop gain by adjusting when the detected torque command is large in magnitude, and increasing a velocity loop gain by adjusting when the detected torque command is small in magnitude.

Preferably, the method of controlling a servomotor in accordance with the present invention comprises the steps of dividing in advance the magnitude of a torque command issued from a velocity loop control into a plurality of regions of different magnitude judging which region the magnitude of a torque command falls under, assigning a value of a gain for adjustment to each of the regions, and applying the gain for adjustment corresponding to the region to the torque command.

Preferably, the method of the invention comprises the steps of deriving a torque command value Tc1 through a velocity loop control with a preset velocity loop gain, multiplying thus derived torque command value Tc1 by a gain G for adjustment which has been previously determined corresponding to the torque command value Tc1, and using thus obtained product as a torque command to be fed to the servomotor. More specifically, the gain G for adjustment is derived from the expression $$G = 1 + \{Imax/(|Tc1| + \delta)\}$$

where the torque command value Tc1 is a variable, Imax representing a producible torque command maximum is a constant, and $\delta$ represents a gain adjustment value set through a control system. It is to be appreciated, however, that the gain adjustment value may be determined by the producible torque command maximum Imax.

The above-described servomotor control includes a position loop in addition to the velocity loop. A feedforward control may be arbitrarily introduced into the positional loop.

The above-described servomotor control can be effected by either a digital servo or an analog servo.

According to the present invention, as described above, a gain in the velocity control section can be increased when both the velocity deviation and the torque command are small in magnitude, in order to improve the responsibility and rapidity of convergence of both the positional deviations and velocity deviations. On the contrary, the gain in the velocity control section can be suppressed in the case of a larger torque command, in order to prevent the occurrence of a mechanical resonance. As a result, the present invention provides a servo control method ensuring a reduction in velocity fluctuation, overshoot or undershoot, even when the velocity command varies largely, as well as an improved resistivity against a disturbance.

DETAILED DESCRIPTION OF THE PREFERRED EMBODIMENTS

Figure 1:
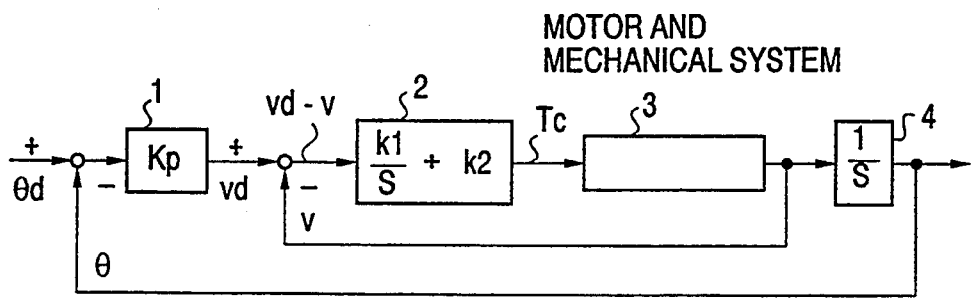
FIG. 1 is a block diagram of a positional control system, including a velocity control, intended for a servomotor.
Figure 2:
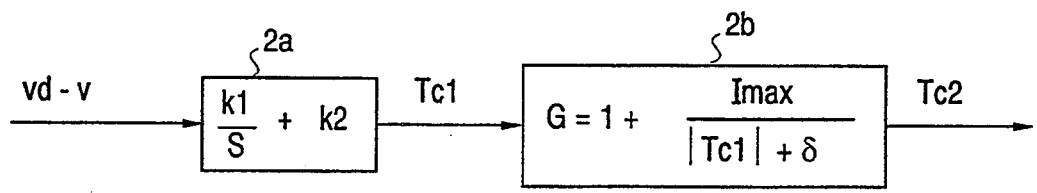
FIG. 2 is a block diagram of a velocity control section in an embodiment of the present invention.

FIG. 2 shows a block diagram of a preferred embodiment of a velocity control section in accordance with the present invention, comprising a control block 2a, equivalent to a velocity control section (proportional plus integral control) 2 depicted in FIG. 1, and an additional block 2b for gain adjustment. More specifically, the control block 2a receives a velocity deviation (vd−v) in the same manner as the conventional velocity control section 2, and executes a proportional plus integral control to output a torque command Tc1. The gain adjustment block 2b finds a gain G for adjustment in compliance with the magnitude of the torque command Tc1, and multiplies the torque instruction Tc1 by the obtained gain G to output a torque command Tc2 for a motor and mechanical system.

In this embodiment, the gain obtained by the above-described gain adjustment block 2b is intended to be determined by using the following expression (1):

$$G = Tc2/Tc1 \qquad (1)$$
$$= 1 + Imax/(|Tc1| + \delta)$$

where $\delta$ is a parameter for determining the magnitude of the adjustment gain according to an object to be controlled, as well as according to a machine to be driven by a servomotor and its action; and Imax is a maximum output of the torque command (or drive current) available to the servomotor.

Figure 3:
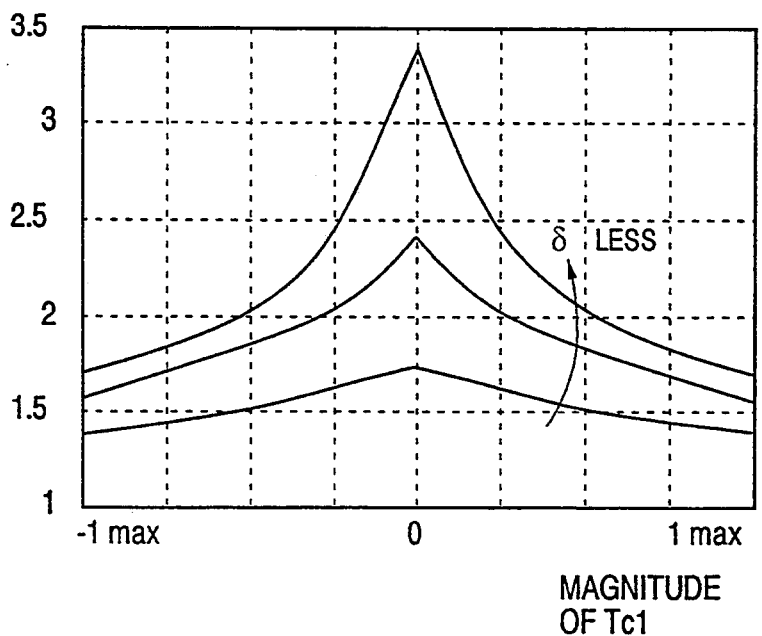
FIG. 3 is an explanatory diagram for explaining an adjustment gain to be found by a gain adjustment block in the embodiment.

FIG. 3 is a graphic description of an example of a relation between the torque command Tc1 and the gain G represented by the expression (1), in which the horizontal axis represents values (0 to Imax) of the torque command Tc1 received from the control block 2a. It is to be appreciated that the adjustment gain G increases as the parameter $\delta$ decreases. Moreover, the adjustment gain G increases as the absolute value of the torque command Tc1 output from the control block 2a decreases, whereas the adjustment gain G becomes closer to 1 as the absolute value of the torque command Tc1 increases.

Figure 4:
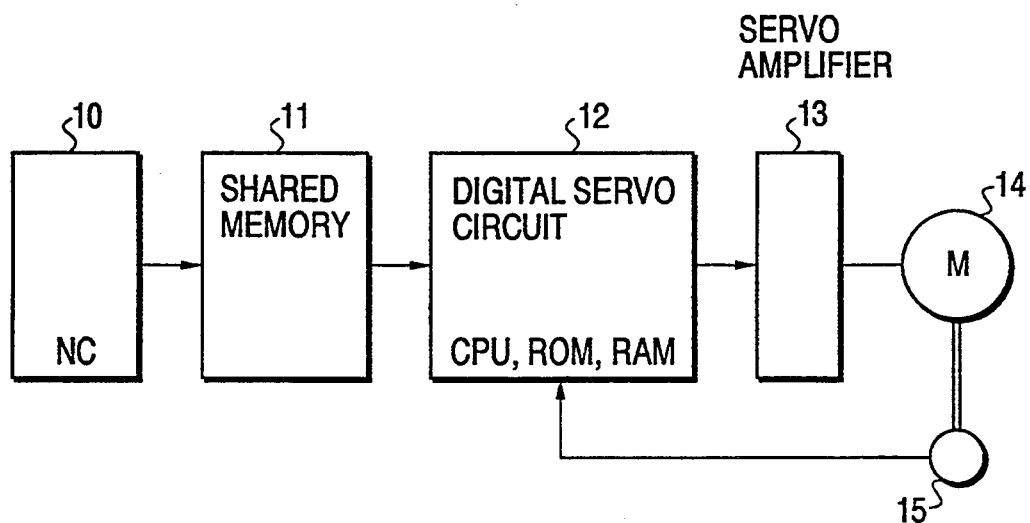
FIG. 4 is a block diagram of a principal part of a servomotor control in a machine for practicing an embodiment in accordance with the present invention.

FIG. 4 is a block diagram showing a principal part of a servomotor control in a machine for practicing a servo control method in accordance with the present invention. The servomotor control comprises a controller 10 such as a numerical-control unit for controlling a machine, a shared memory 11 for receiving a variety of commands for a servomotor 14 issued from the controller 10 for the delivery to a processor within a digital servo circuit 12, the digital servo circuit 12 comprising a ROM, a RAM, and the processor, through which a position, velocity and current of the servomotor 14 are controlled; a servo amplifier 13 comprising a transistor inverter, etc.; the servomotor 14; and a position/velocity detector 15 for detecting a rotational position and velocity of the servomotor 14 for feedback to the digital servo circuit 12.

The above arrangement is substantially the same as that in a known digital servo circuit for use in the servo motor control for robots, machine tools or the like.

Figure 5:
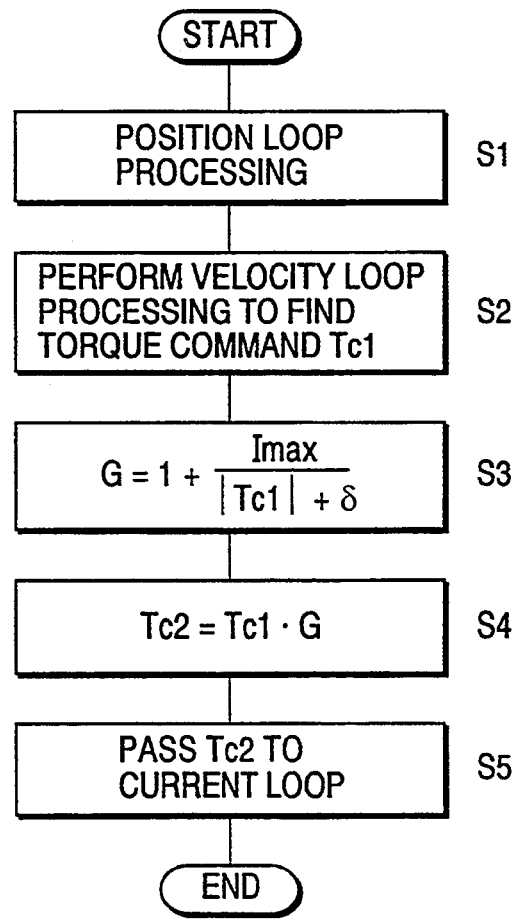
FIG. 5 is a flowchart of processing to be executed by a processor within a digital servo circuit in the same embodiment.

FIG. 5 is a flowchart of a series of processings to be performed by the processor in the digital servo circuit 12 for each position/velocity loop processing cycle.

The processor in the digital servo circuit 12 reads a move command issued from the controller 10 by way of the shared memory 11 to find a move command $\theta$d for each position/velocity loop processing cycle in the same manner as the conventional position loop control, derives a positional deviation by subtracting a positional feedback quantity received from the position/velocity detector 15 from the move command $\theta$d, and obtains a velocity command by multiplying the positional deviation by a position gain Kp (Step S1). A velocity deviation is then found by subtracting a velocity feedback quantity received from the position/velocity detector 15 from the obtained velocity command, and a torque command Tc1 is obtained through a proportional plus integral control in the same manner as in the conventional velocity control (Step S2). Substituting thus obtained torque command Tc1, value $\delta$ of the parameter being set in advance, and the maximum Imax of the drive current in the above expression (1), a gain G for adjustment can be obtained (Step S3). Then, the torque command Tc1 determined in Step S2 is multiplied by thus obtained gain G to establish an adjusted torque command Tc2, which is in turn passed to a current loop for the termination of the position/velocity loop processing in this cycle (Steps S4 and S5). These series of processes S1 to S5 are subsequently repeated for each position/velocity loop processing cycle.

As described above, in addition to the torque command Tc1 derived through an ordinary velocity loop control processing, that is, the processing performed by the control block 2a in Step S2, the gain G for adjustment is found in Step S3 to finally establish the torque command Tc2 for the motor, that is, the product of the torque command Tc1 and the gain G (in Step 4). Thus, if not only the positional deviation and the velocity deviation but also the value of the torque command Tc1 are small, the torque command Tc1 is multiplied by a relatively large adjustment gain G to increase a velocity loop gain, thereby allowing the positional and velocity deviations to be sharply converged, which provides a highly responsive control system. On the contrary, if not only the positional deviation and the velocity deviation but also the torque command Tc1 are large, the adjustment gain G will have a small value, thereby not only preventing the entire velocity loop gain from increasing too largely but also consequently preventing the occurrence of a mechanical resonance.

Figure 6:
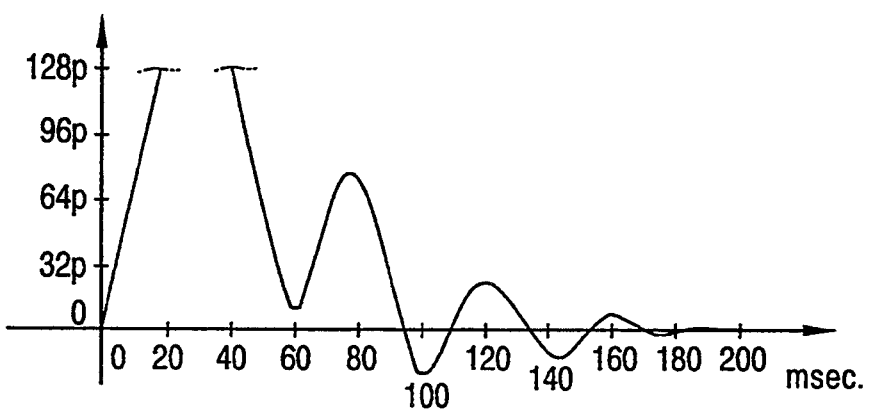
FIG. 6 illustrates the state of positional deviations occurring when a rapid positioning is carried out by a conventional method.
Figure 7:
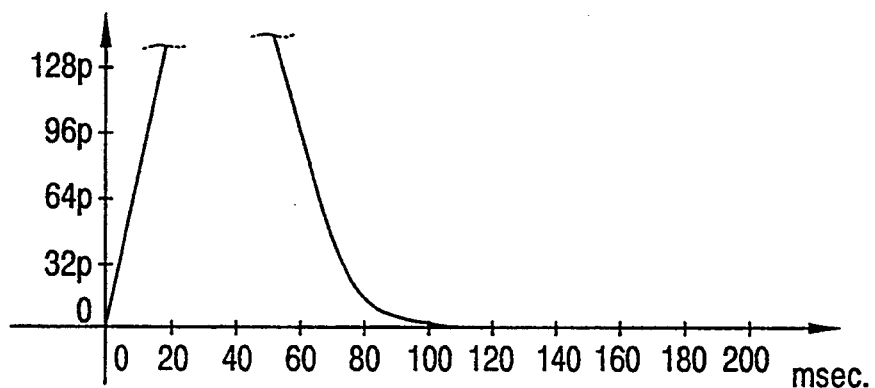
FIG. 7 illustrates the state of positional deviations occurring when a rapid positioning is carried out by the method of the present invention under the same conditions as in FIG. 6.

FIGS. 6 and 7 are graphs illustrating the state of the positional deviations detected through experiments by both the conventional method (FIG. 6) and the method of this embodiment (FIG. 7), both using a parameter of Imax/2 and move command of a 25.4 mm for rapid positioning. In FIGS. 6 and 7, the horizontal and vertical axes represent lapse of time and positional deviation, respectively, with one pulse corresponding to 1 $\mu$m (1p=1 $\mu$m). In the conventional method, as is apparent from FIG. 6, overshoot and undershoot occur, and the positional deviations are not permitted to converge until approximately 180 msecs has elapsed, meaning that a certain lapse of time is necessary to complete the positioning. On the contrary, the method of the present invention shown in FIG. 7 presents neither overshoot nor undershoot, and requires a relatively short lapse of time such as 120 msec for the convergence of the positional deviations.

Figure 8:
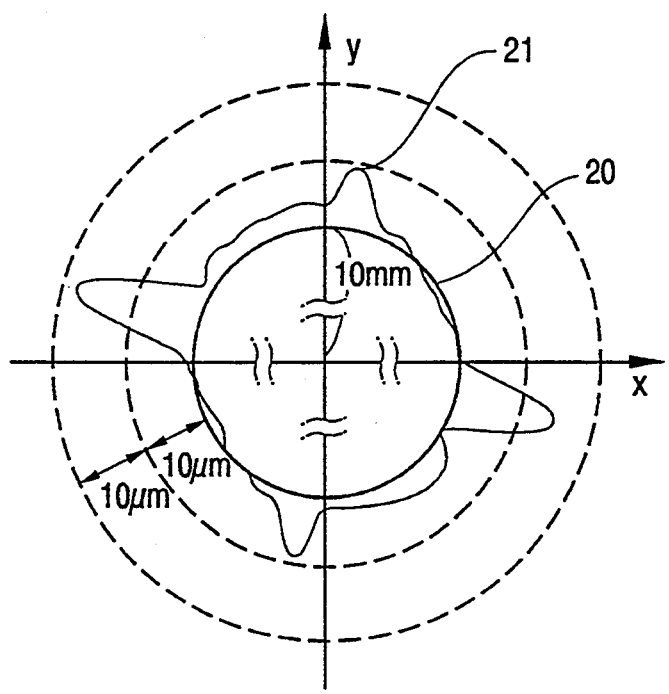
FIG. 8 depicts the state observed when a circular cutting is effected by a conventional method.
Figure 9:
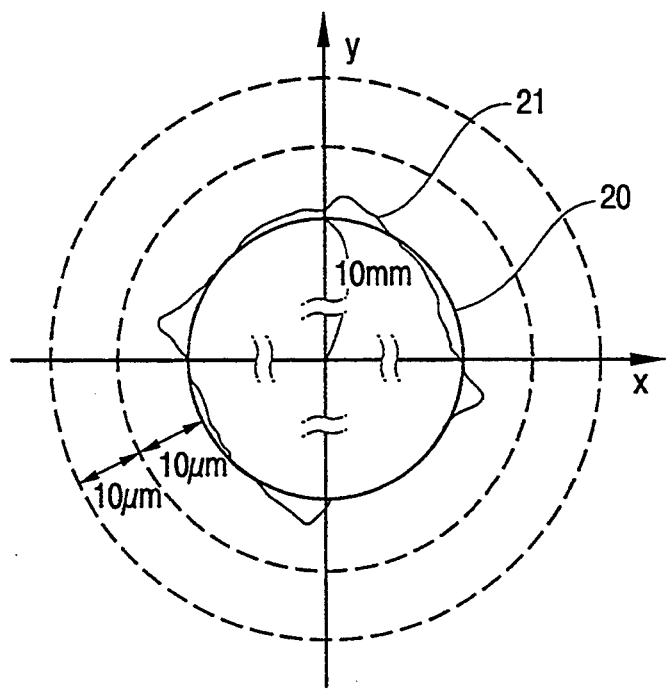
FIG. 9 depicts the state observed when a circular cutting is effected by the method of the present invention under the same conditions as in FIG. 8.

FIG. 8 shows the cutting shapes obtained through circular cutting of 10-mm radius using the conventional method, while FIG. 9 shows the cutting shapes resulting from the circular cutting according to the method of present invention with the parameter of Imax/2. It is to be understood that the method in accordance with the present invention is much improved for cutting accuracy as is clear from FIGS. 8 and 9, in which a circle designated by reference numeral 20 is a commanded circular shape, and an actual cutting circular shape is designated at 21.

In this embodiment, the adjustment gain G has been derived from the arithmetic expression (1); however, any other suitable method may be employed as long as the adjustment gain G can be decreased when the torque command Tc1 is large but increased when it is relatively small depending on the magnitude of the torque command Tc1 received from the conventional velocity control section (or the control block 2a) instead of obtaining the adjustment gain G through the arithmetic expression (1).

Furthermore, in the above embodiment, a torque command Tc1 (variable) and a maximum Imax (constant) of a motor drive current are used with a parameter of Imax/2 in determining the adjustment gain G by the expression (1); however, the value of the parameter need not necessarily be limited to the Imax/2 and to the value associated with the maximum Imax of the motor drive current.

Still further, in determining the adjustment gain G without performing the arithmetic represented by the expression (1), the range of the magnitude of the torque commands to be outputted from the conventional velocity control section (or the control block 2a) may be divided into several regions, each being provided with a different adjustment gain, and then it is judged which region a torque command Tc1 falls under, to find an adjustment gain G corresponding to that region.

In the above embodiment, a description has been made of an example of digital servo control; however, the present invention may be applied to any analog servo control.

Further, in this embodiment, the control by the velocity control section is described in terms of a proportional plus integral control; however, the present invention may also be applied to a case of an integral plus proportional control.

Furthermore, the present invention may also be applied to a case where a feedforward control is introduced into the position loop control.

Further, the present invention may also be applied to a case wherein only the velocity control is performed without effecting the position loop control.

To sum up, the present invention provides a servo control method, wherein the variation of the adjustment gain G decreases when the torque command Tc1 received from the velocity control section is large in magnitude but increases when it is small, whereby the convergence of both the positional deviation and the velocity deviation are accelerated to improve a responsibility; the occurrence of the mechanical resonance is prohibited; and fluctuation or an overshoot or undershoot are prevented irrespective of a large variation in the velocity command, which cooperatively contribute to the improvement of the resistivity against a disturbance.

As described above, according to the present invention, the gain is increased when the torque command issued from the velocity control is small in magnitude, to thereby enlarge the torque command for the drive of the servomotor. In consequence, both the positional deviation and velocity deviation can be converged rapidly to improve the responsibility. On the contrary, the gain is restrained to a smaller value when the torque command is large in magnitude due to a larger original control quantity, thereby preventing the occurrence of the mechanical resonance. This leads to a higher responsibility and a higher resistivity against the disturbance, which enables us to obtain improved servo control characteristics being free of any mechanical resonance.

What is claimed is:

1. A method of controlling a servomotor, comprising a step of:
    adjusting a velocity loop gain of said servomotor based on a magnitude of a torque command issued from a velocity loop control of said servomotor.

2. A method of controlling a servomotor, comprising steps of:
    detecting a magnitude of a torque command issued from a velocity loop control of said servomotor;
    decreasing a velocity loop gain of said servomotor when the detected magnitude of the torque command is large; and
    increasing a velocity loop gain of said servomotor when the detected magnitude of the torque command is small.

3. A method of controlling a servomotor, comprising steps of:
    dividing magnitudes of torque commands issued from a velocity loop control of said servomotor into a plurality of regions of different magnitude;
    assigning a value of a gain for adjustment to each of said plurality of regions of different magnitude;
    determining a region of said plurality of regions for which a magnitude of a detected torque command falls within; and
    applying said assigned value of gain for adjustment corresponding to said region to said detected torque command.

4. A method of controlling a servomotor comprising steps of:

determining a torque command value Tc1 based on a velocity loop control of said servomotor having a preset velocity loop gain;

multiplying the determined torque command value Tc1 by an adjustment gain G and thereby obtaining a product as a torque command value Tc2, said adjustment gain G being determined based on said torque command value Tc1; and providing the obtained product as the torque command value Tc2 to said servomotor.

5. A method of controlling a servomotor according to claim 4, wherein said adjustment gain G is determined from the expression $$G = 1 + \{Imax/(|Tc1| + \delta)\}$$

where said torque command value Tc1 is a variable, Imax representing a producible torque command maximum is a constant, and $\delta$ represents a gain adjustment value set through a control system.

6. A method of controlling a servomotor according to claim 5, wherein said gain adjustment value $\delta$ is determined by said producible torque command maximum Imax.

7. A method of controlling a servomotor according to claims 1, wherein said servomotor control includes a position loop in addition to said velocity loop.

8. A method of controlling a servomotor according to claims 1, wherein said servomotor control includes a position loop in addition to said velocity loop, and wherein a feedforward control is introduced into the positional loop.

9. A method of controlling a servomotor according to claims 1, wherein said servomotor control is effected by a digital servo.

10. A method of controlling a servomotor according to claims 1, wherein said servomotor control is effected by an analog servo.

* * * * *

UNITED STATES PATENT AND TRADEMARK OFFICE
CERTIFICATE OF CORRECTION

PATENT NO.  : 5,374,882
DATED       : December 20, 1994
INVENTOR(S) : Shunsuke Matsubara et al It is certified that error appears in the above-indentified patent and that said Letters Patent is hereby corrected as shown below:

Title page: [75] delete "Oshino" and insert -- Minamitsuru-Gun--.

Title page: [30] delete "3-322425" and insert --322425--.

Col. 2, line 43, delete "|Tc1|" and insert --|Tc1|--.

Signed and Sealed this

Thirteenth Day of June, 1995

Attest:

Attesting Officer

BRUCE LEHMAN

Commissioner of Patents and Trademarks